United States Patent
DeLuca et al.

(10) Patent No.: US 9,916,861 B2
(45) Date of Patent: Mar. 13, 2018

(54) EDITING MEDIA ON A MOBILE DEVICE BEFORE TRANSMISSION

(71) Applicant: International Business Machines Corporation, Armonk, NY (US)

(72) Inventors: Lisa Seacat DeLuca, Baltimore, MD (US); Geetika T. Lakshmanan, Winchester, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/741,652

(22) Filed: Jun. 17, 2015

(65) Prior Publication Data
US 2016/0372153 A1    Dec. 22, 2016

(51) Int. Cl.
*G11B 27/031*    (2006.01)
*H04N 1/00*    (2006.01)

(52) U.S. Cl.
CPC ....... *G11B 27/031* (2013.01); *H04N 1/00095* (2013.01)

(58) Field of Classification Search
CPC ........ G06T 7/246; G06K 9/3233; G06K 9/46; G06K 9/00617; G06K 9/3241; G06K 9/00711; G06F 3/013
See application file for complete search history.

(56) References Cited

U.S. PATENT DOCUMENTS

| | | | |
|---|---|---|---|
| 6,654,507 | B2 | 11/2003 | Luo |
| 7,034,848 | B2 | 4/2006 | Sobol |
| 7,503,653 | B2 | 3/2009 | Endrikhovski et al. |
| 8,009,921 | B2 | 8/2011 | Csurka |
| 8,391,593 | B2 | 3/2013 | Lin et al. |
| 8,620,058 | B2 | 12/2013 | Nepomniachtchi et al. |
| 9,538,219 | B2 | 1/2017 | Sakata et al. |

(Continued)

FOREIGN PATENT DOCUMENTS

| | | |
|---|---|---|
| EP | 1968008 A2 | 9/2008 |
| EP | 2667292 A2 | 11/2013 |

(Continued)

OTHER PUBLICATIONS

Henry, "NoCrop Automatically Formats Your Photos for Instagram and Other Networks, No Cropping Required," lifehacker, Feb. 21, 2013, p. 1, http://lifehacker.com/5985873/nocrop-automatically-formats-your-photos-for-instagram-and-other-networks-no-cropping--required, Accessed on Apr. 21, 2015.

(Continued)

*Primary Examiner* — Hung Dang
*Assistant Examiner* — Sunghyoun Park
(74) *Attorney, Agent, or Firm* — Robert C. Bunker

(57) ABSTRACT

According to one exemplary embodiment, a method for editing at least one media file on a device is provided. The method may include receiving the at least one media file. The method may also include determining a content of interest region within the at least one media file. The method may then include generating an at least one edited media file based on the content of interest region and the at least one media file. The method may further include transmitting the at least one edited media file to a target destination.

15 Claims, 5 Drawing Sheets

(56) References Cited

U.S. PATENT DOCUMENTS

| | | | |
|---|---|---|---|
| 2001/0005204 A1* | 6/2001 | Matsumoto | G06T 15/04 345/418 |
| 2002/0085840 A1* | 7/2002 | Liebenow | G03B 15/00 396/2 |
| 2002/0191861 A1 | 12/2002 | Cheatle | |
| 2004/0239982 A1* | 12/2004 | Gignac | G06T 3/00 358/1.15 |
| 2007/0109324 A1* | 5/2007 | Lin | H04N 5/4403 345/671 |
| 2007/0201765 A1* | 8/2007 | DuBois | G06K 9/3233 382/293 |
| 2008/0019661 A1* | 1/2008 | Obrador | G11B 27/034 386/210 |
| 2008/0291265 A1* | 11/2008 | Wagner | H04N 7/152 348/14.16 |
| 2009/0034800 A1* | 2/2009 | Vau | G06F 1/1626 382/107 |
| 2009/0119333 A1 | 5/2009 | Sundstrom et al. | |
| 2009/0273711 A1* | 11/2009 | Chapdelaine | G06K 9/00711 348/465 |
| 2010/0111196 A1* | 5/2010 | Lynch | G06T 7/0083 375/240.26 |
| 2010/0232706 A1* | 9/2010 | Forutanpour | H04N 5/23248 382/199 |
| 2010/0266208 A1* | 10/2010 | Downing | H04N 1/3872 382/195 |
| 2012/0026277 A1* | 2/2012 | Malzbender | H04N 7/147 348/14.07 |
| 2014/0089097 A1 | 3/2014 | Byun et al. | |
| 2016/0259977 A1* | 9/2016 | Asbun | A61B 5/165 |

FOREIGN PATENT DOCUMENTS

| | | |
|---|---|---|
| WO | 2005015355 A2 | 2/2005 |
| WO | 2013133893 A1 | 9/2013 |

OTHER PUBLICATIONS

Jay, "How to Stop Automatic Photo Cropping in Facebook," Houston Chronicle, p. 1-2, Hearst Newspapers, LLC, http://smallbusiness.chron.com/stop-automatic-photo-cropping-facebook-50455.html, Accessed on Apr. 21, 2015.

Mell et al., "The NIST Definition of Cloud Computing," National Institute of Standards and Technology, Sep. 2011, p. 1-3, Special Publication 800-145.

Pizzi, "Select Part of an Image," Adobe Photoshop CC Tutorials, Jun. 18, 2014, p. 1-2, Adobe Systems Incorporated, Accessed on Apr. 21, 2015. https://helpx.adobe.com/photoshop/how-to/select-part-photo.html, Accessed on Apr. 21, 2015.

Tong et al., "Blur Detection for Digital Images Using Wavelet Transform," IEEE International Conference on Multimedia and Expo (ICME), 2004, p. 17-20.

Wikipedia, "Eye tracking," Wikipedia: the Free Encyclopedia, Last Modified on Mar. 31, 2015, p. 1-16, http://en.wikipedia.org/wiki/Eye_tracking, Accessed on Apr. 21, 2015.

* cited by examiner

EDITING MEDIA ON A MOBILE DEVICE BEFORE TRANSMISSION

BACKGROUND

The present invention relates generally to the field of computing, and more particularly to electronic media editing.

Mobile devices are commonly used to generate media and transmit generated media for sharing using social media sites, emails, blogs, etc. Transmitting media produces loads on mobile networks and uses large amounts of data that may impact users with limited mobile data plans. Additionally, high traffic loads impact mobile network carriers that own and operate the mobile networks.

SUMMARY

According to one exemplary embodiment, a method for editing at least one media file on a device is provided. The method may include receiving the at least one media file. The method may also include determining a content of interest region within the at least one media file. The method may then include generating an at least one edited media file based on the content of interest region and the at least one media file. The method may further include transmitting the at least one edited media file to a target destination.

According to another exemplary embodiment, a computer system for editing at least one media file on a device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the at least one media file. The method may also include determining a content of interest region within the at least one media file. The method may then include generating an at least one edited media file based on the content of interest region and the at least one media file. The method may further include transmitting the at least one edited media file to a target destination.

According to yet another exemplary embodiment, a computer program product for editing at least one media file on a device is provided. The computer program product may include one or more computer-readable storage devices and program instructions stored on at least one of the one or more tangible storage devices, the program instructions executable by a processor. The computer program product may include program instructions to receiving the at least one media file. The computer program product may also include program instructions to determine a content of interest region within the at least one media file. The computer program product may then include program instructions to generate an at least one edited media file based on the content of interest region and the at least one media file. The computer program product may further include program instructions to transmit the at least one edited media file to a target destination.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
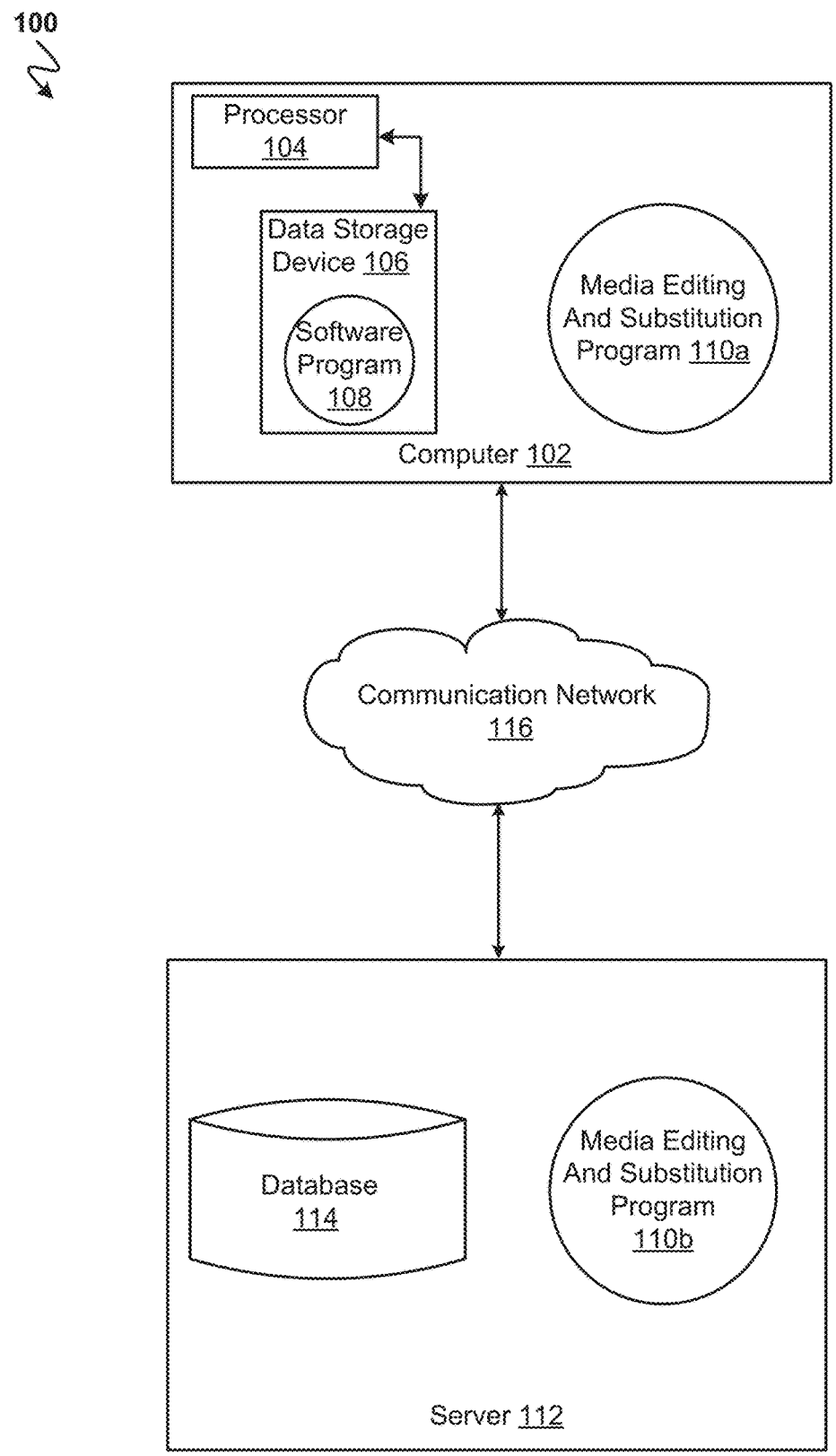
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for editing media on a device (e.g., mobile device such as a smartphone, etc.) before transmission. As such, the present embodiment has the capacity to improve the technical field of editing electronic media by automatically determining content of interest within electronic media (e.g., by gaze tracking a user's eyes), automatically editing the media based on the identified content of interest, and transmitting the edited media in place of the unedited original media to the user-specified target.

As described previously, mobile devices are commonly used to generate media and transmit generated media for sharing on social media sites, emails, blogs, etc. Transmitting media produces loads on mobile networks and uses large amounts of data that may impact users with capped mobile data plans. Additionally, media generated by devices may contain excess data (e.g., a picture may have large amounts of area shown that are not wanted such as ceilings in the background) that may safely be removed without impacting the content of interest (i.e., the important, relevant data) in the media. Transmitting media containing unneeded data wastes resources. For most users, editing out excess data (e.g., cropping an image) may be a tedious and time consuming process, especially when a user is attempting to edit media on a mobile device due to a small screen and limited input methods.

Therefore, it may be advantageous to, among other things, provide an automated way to determine the content of interest in electronic media files on a device, automatically edit the media to remove excess data while preserving the content of interest, and transmit the smaller edited media file in place of the larger original media file.

According to at least one embodiment, a user generates electronic media (e.g., digital photos, digital video file, etc.)

using a device (e.g., the user's smartphone). The media the user generated may include excess data that is not relevant to the content of interest. For example, a user may take a picture of their colleagues at a lunch event. The user's picture may contain 50% excess data, such as the ceiling, floor, and unrelated persons in the background. The content of interest, the user's colleagues, may occupy the remaining 50% of the picture taken by the user.

Next, the media is automatically edited to omit excess data (i.e., data not relating to the content of interest) in order to reduce the file size of the media before it will be transmitted to a user-defined target (e.g., email attachment, social networking site post, blog post, etc.). According to at least one embodiment, known eye tracking techniques are used (e.g., by a front-facing camera in the user's mobile device) to help identify which pixels are of interest when the user views media on a device. Based on the identified pixels that are of interest to the user, the content of interest in the media is identified. For example, if the user took a picture of their colleagues at a lunch, the user may view the picture later on their smartphone. The smartphone's front-facing camera may track the user's eye movement and be used to determine the regions of the picture that the user looked at most. Based on the detected eye tracking, the content of interest within the picture may be identified.

Additionally, if the user generated similar media in succession (e.g., took multiple photos of the same scene within seconds), the identified content of interest data may be applied to successively generated media that the user has not taken the time to view, since the content of interest may be similarly positioned and sized in subsequent media. Determining if media is similar enough to automatically apply content of interest designations may be done by comparing the differences between the media files automatically against a threshold value, by having the user indicate media files that are similar, by considering the media files within a folder to be similar, etc.

According to at least one other embodiment, the name the user gives to the media file or the folder that the user stores the media file in, is used to help identify the content of interest. Based on the filename or folder name, analysis of the media is used to identify and match object candidates within the media to the name the user associates with the media file or folder. For example, if the user stores a picture in a folder named "colleagues", the picture may be analyzed to identify the user's colleagues as the content of interest in the picture.

According to yet another embodiment, the content of the user-defined destination for the media is used to help identify the content of interest. For example, if the user flags a picture to upload to a blog post about a lunch the user attended with their colleagues, the content of the blog post may be read and analyzed using known methods to determine that the content of interest in the picture may be the user's colleagues.

After the content of interest has been identified within the media, the media is edited to omit excess data that may not be relevant to the content of interest. According to at least one embodiment, a combination of cropping, scaling, and content-based image retargeting is used to edit the media.

Then, it is determined if the user selected the generated media to transmit to another destination. According to at least on embodiment, when the user designates the generated media for transmission (e.g., as an email attachment), an indicator is generated. Based on the indicator, it is determined that the user is attempting to transmit the generated media.

In response to determining that the user intends to transmit the generated media, the edited media is sent in place of the unedited original media. According to at least one embodiment, substitution of the edited media occurs automatically before transmission. According to at least one other embodiment, the user is presented with the opportunity to review the automatically edited media file and the original media file and given the choice to indicate which media file to transmit.

Edited media reduces the amount of data that is transmitted, thus saving the user data in a limited data plan as well as reduce network loads needed to transmit larger media files. Additionally, the target (i.e., destination) for transmitting the media file may be to a storage device, such as the internal storage within the user's mobile device.

According to at least one embodiment, transmission of the media file to the user-defined target may be handled by another program or application. For example, if the user designates the media file for transmission as an email attachment, an email client application on the user's smartphone may handle transmitting the media file from the smartphone to the email distribution system. However, the program or application will be redirected to transmit the edited media file instead of the original media file.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a media editing and substitution program 110*a*. The networked computer environment 100 may also include a server 112 that is enabled to run a media editing and substitution program 110*b* that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the media editing and substitution program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the media editing and substitution program 110a, 110b (respectively) to automatically retarget media (e.g., pictures) to omit excess data not related to the content of interest within the media before the media is transmitted. The media editing and substitution method is explained in more detail below with respect to FIG. 2.

Figure 2:
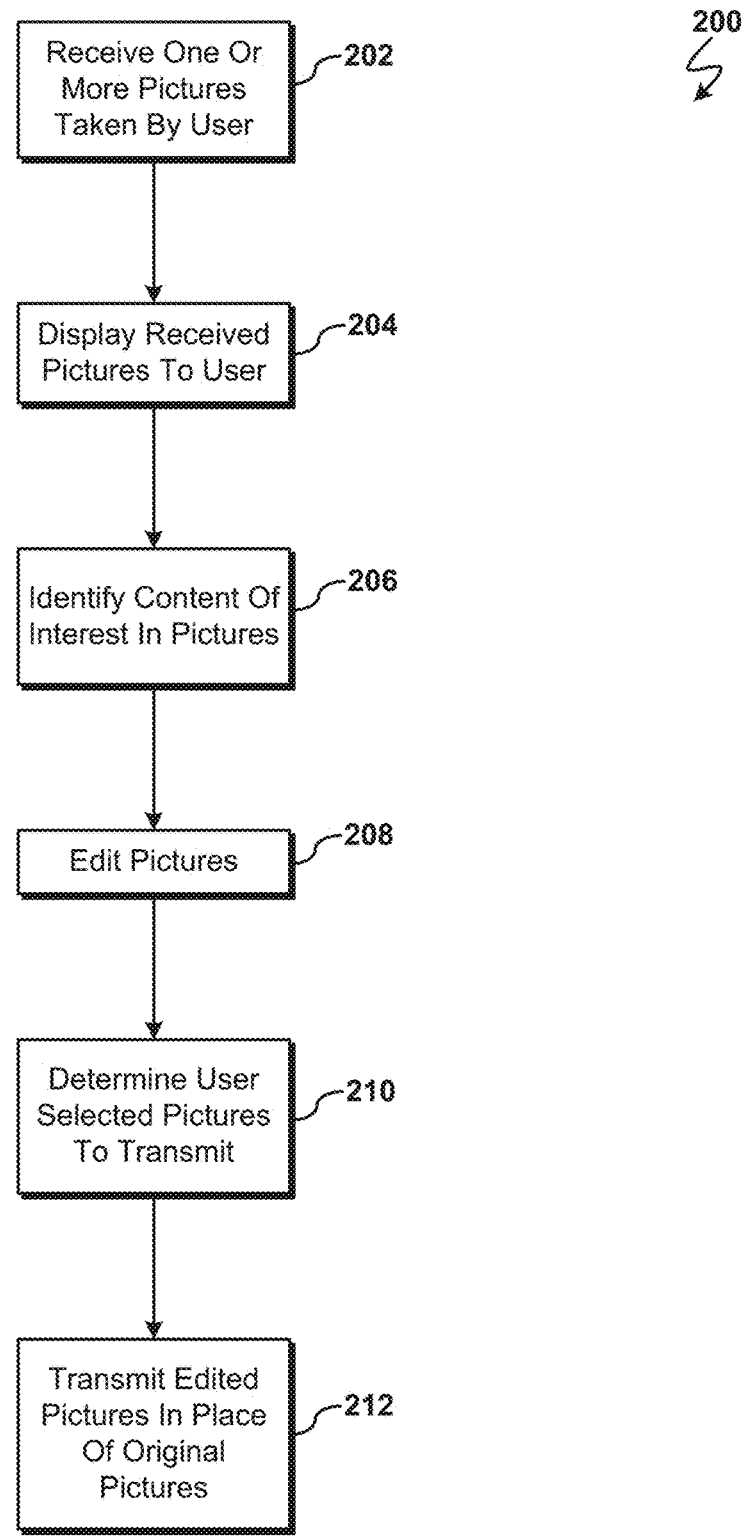
FIG. 2 is an operational flow chart illustrating a process for automatically editing and substituting media before transmission according to at least one embodiment.

Referring now to FIG. 2, an operational flow chart illustrating the steps 200 used by a program to automatically edit media on a device (e.g., mobile device) before transmission according to at least one embodiment is depicted.

At 202 pictures (i.e., media) taken by the user are received for processing on a mobile device (e.g., smartphone). According to at least one embodiment, the user's mobile device may be used to generate the media that is accessed for later editing. For example, the user may take a picture with their smartphone and the picture taken by the user may be received. According to at least one other embodiment, the received media is generated on a different device and sent to the user's device for automatic editing and subsequent transmission.

Next, at 204, at least one of the pictures received is displayed to the user. According to at least one embodiment, the media generated under the direction of the user is displayed to the user to view. For example, if a user took a series of twenty pictures with their smartphone, the first picture may be displayed on the smartphone's screen and include a button or gesture recognition to allow the user to change the picture displayed and allow the user to view the other pictures taken in the picture series.

Then, at 206, the content of interest (i.e., the part of the image that is important to the user) within the pictures is identified. According to at least one embodiment, known eye tracking methods are used to identify the content of interest region within the pictures displayed to the user at 204. In instances when a user's mobile device includes a front-facing camera, the front-facing camera may be used to implement eye tracking while the user views the displayed media. For example, if the user views a picture showing the user's friends in the center of the image, the user's eyes may spend more time looking at the center of the image on the mobile device's screen. Through eye tracking, the mobile device's front-facing camera is used to follow the user's eyes and determines the pixels on the image that the user looks at. The area of the picture that the user looked at is then designated as the portion of the picture that contains the content of interest. Additionally, if the user took a series of related pictures (e.g., the user took ten pictures within thirty seconds), the data indicating the areas of the media that the user reviewed containing content of interest (e.g., an area defined in pixels by X and Y coordinates) can be used to identify content of interest in related pictures in the series that the user may have not taken the time to review since the composition and location of elements within the related pictures may be similar.

According to at least one other embodiment, content of interest is identified based on the name of the folder the user stores the image in or the filename the user gives to the media. For example, if the user stores a picture in a folder named "my dog", the pictures stored in the folder may be analyzed using known image analysis methods to identify a dog as the content of interest.

According to yet another embodiment, content of interest is identified based on data relating to the transmission target destination. For example, if the user attaches the media to an email, data relating to the email, such as the email's subject text, may be analyzed to identify the content of interest. If the user's email includes in the subject "pictures of my new car", the pictures may be analyzed using known image analysis methods to identify a car as the content of interest within the pictures.

According to an alternative embodiment, the user can expressly select what the content of interest region is in one or more images. The user can indicate the content of interest by entering text describing the content of interest (e.g., faces, sky, tree), or by manipulating a resizable shape to outline the content of interest (e.g., a marquee tool). The user can then indicate if the same content of interest indication should be applied to other pictures (i.e., the text describing the content of interest or the user-manipulated resizable shape should be applied to other media files).

Identifying the content of interest within media may done through the previously described methods, other known methods (e.g., emotion tracking, crowdsourcing, etc.), or a combination of methods.

At 208 the pictures are automatically edited based on the identified content of interest. According to at least one embodiment, known automatic image rescaling (i.e., zooming) and cropping methods are used to remove excess data from the media that is not relevant to the identified content of interest. For example, if the user has taken a picture with a dog as the content of interest taking up 70% of the center of the picture while being surrounded by irrelevant background (e.g., sky and trees), the excess pixels in the picture surrounding the content of interest (i.e., the remaining 30% of the image not designated as the content of interest) may be cropped out to reduce the image size without affecting the content of interest in the picture.

According to at least one other embodiment, the areas of the media containing the content of interest will have image effects or filters applied (e.g., increased luminance) to the content of interest and/or the areas that do not contain the content of interest. For example, predetermined image effects may be applied to turn areas of the picture that do not contain the content of interest into greyscale while leaving the content of interest in color to emphasize the content of interest within the picture.

Next, at 210, it is determined that the user has selected the media that has been editing to transmit to a target destination. According to at least one embodiment, an indicator is triggered when a user designates the media (e.g., picture) to transmit (e.g., as an email attachment) to another location over a network connection. The indicator may be generated by the operating system, the application the user is using (e.g., email client), etc. that includes data identifying the media selected for transmission and the application transmitting the media. Once an indicator is received or read, it is determined that the user has selected the media that has been edited to transmit. For example, if a user selects a picture to attach to an email using an email client application, the email client application may generate an indicator denoting that the user intends to transmit the picture that includes the picture file identifier (i.e., filename and file location) and the application (i.e., email client) that will initiate the media transmission. The generated indicator is then sent to, and received by, the media editing and substitution program 110a and 110b (FIG. 1).

According to at least one other embodiment, when the user selects the unedited media for transmission (e.g., as an email attachment, to upload to a social networking site, etc.), a notification is displayed to the user allowing the user to select either the original unedited version or the smaller edited version for transmission.

Then, at 212, the edited media is transmitted in place of the original media. According to at least one embodiment, after determining that the user intends to transmit the media from the received indicator at 210, the smaller edited media is substituted and then transmitted transparently. For example, if the user has designated a picture to send as an email attachment, the email client's indicator may be received that specifies the image file that the user intends to send as an email attachment. The media editing and substitution program 110a and 110b (FIG. 1) may then redirect the email client application to use the edited picture in place of the original picture the user designated for attachment.

Additionally, a user-defined data limit may be set and the user's current data use may be compared with the user-defined data limit to when the user selects media (e.g., a series of pictures) to transmit. If the user's current data usage is within a predetermined percentage of the user-defined data limit (e.g., 25%), the media the user selected for transmission is automatically analyzed using known methods to detect blurry images (e.g., wavelet techniques, Fourier transform, etc.) or otherwise undesirable images and automatically omit the blurry images from the media the user transmits. The minimum quality threshold used to determine if an image is blurry may be predefined by the media editing and substitution program 110a and 110b (FIG. 1), set by the user, or set by some other entity.

For example, if the user is within 5% of the user-defined data limit for the month and the predetermined threshold is 25% of the user-defined data limit, when the user attempts to transmit pictures, the pictures will be analyzed before transmission for blurriness since the user's current data usage is above the predetermined threshold of 25%. A series of ten pictures taken by the user will be analyzed if the user designates the series pictures for uploading to a blog. After analyzing the series of pictures, three of the ten pictures may be determined to not meet minimum quality requirements (i.e., the images are blurry) and omitted while the remaining seven are transmitted to the target destination (e.g., blog), thus reducing the data used by the user in the transmission process by omitting the blurry pictures from the series.

According to at least one embodiment, multiple pictures or videos are automatically combined into a single video file, providing the user with the option to transmit multiple related pictures or videos as a single file.

According to at least one other embodiment, transmitting the edited media file includes transmitting the media file to be saved in a storage device (e.g., a hard disk drive), internal or external to the device where the media editing occurred.

It may be appreciated that FIG. 2 provide only an illustration of one embodiment and does not imply any limitations with regard to how different embodiments may be implemented. Many modifications to the depicted embodiment(s) may be made based on design and implementation requirements.

Figure 3:
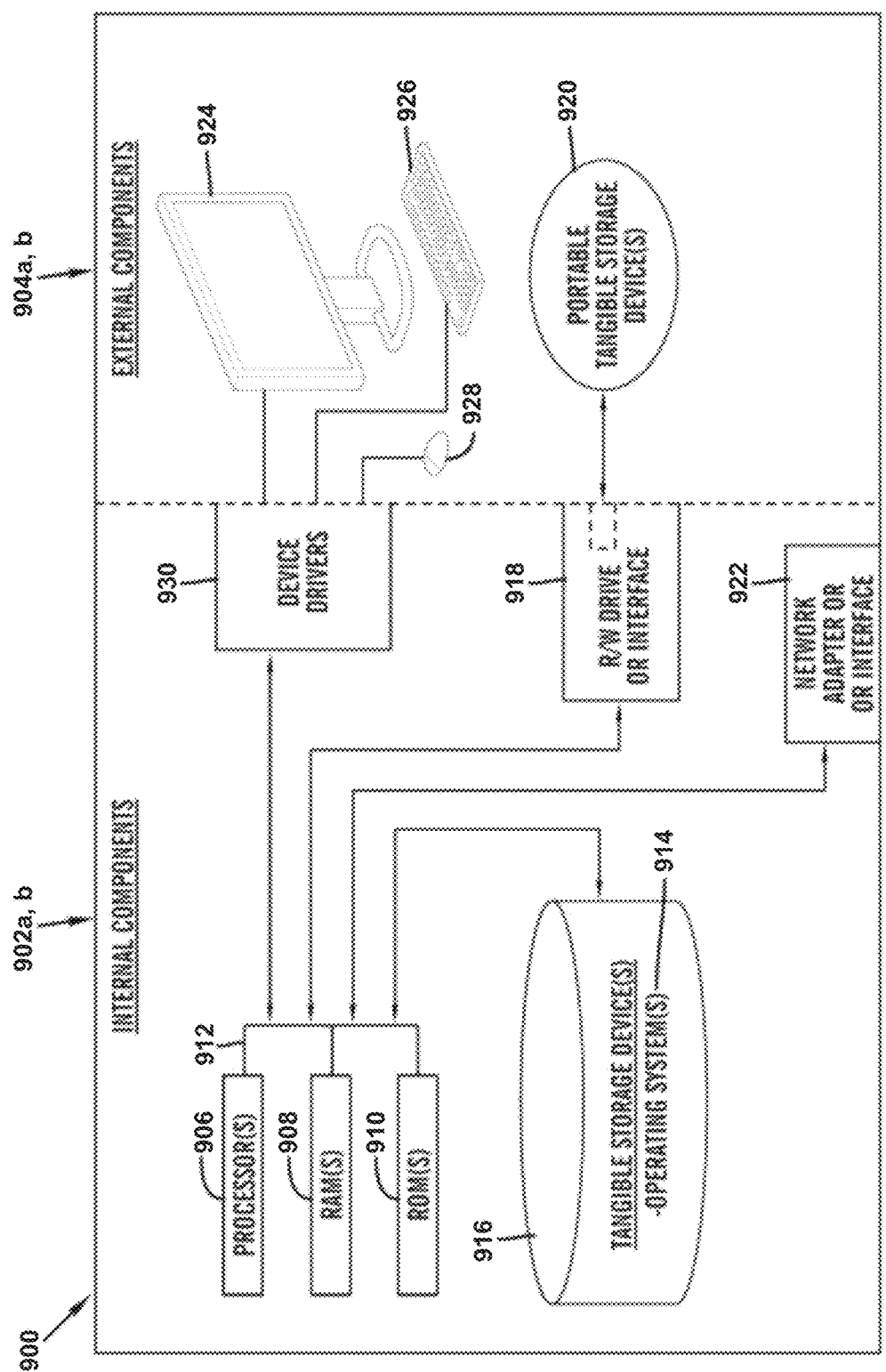
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the media editing and substitution program 110a (FIG. 1) in client computer 102 (FIG. 1) and the media editing and substitution program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the media editing and substitution program 110a and 110b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the media editing and substitution program 110a (FIG. 1) in client computer 102 (FIG. 1) and the media editing and substitution program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the media editing and substitution program 110a (FIG. 1) in client computer 102 (FIG. 1) and the media editing and substitution program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
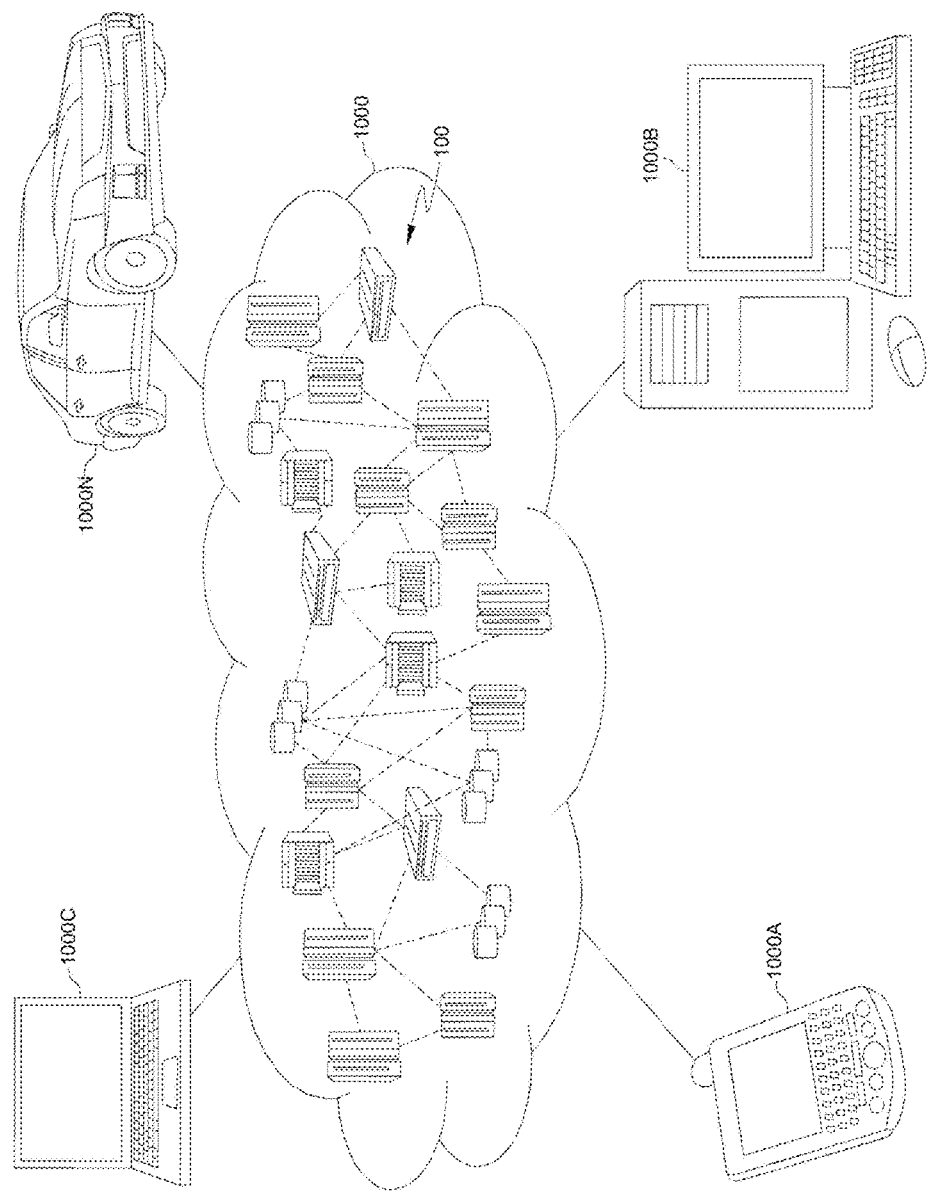
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
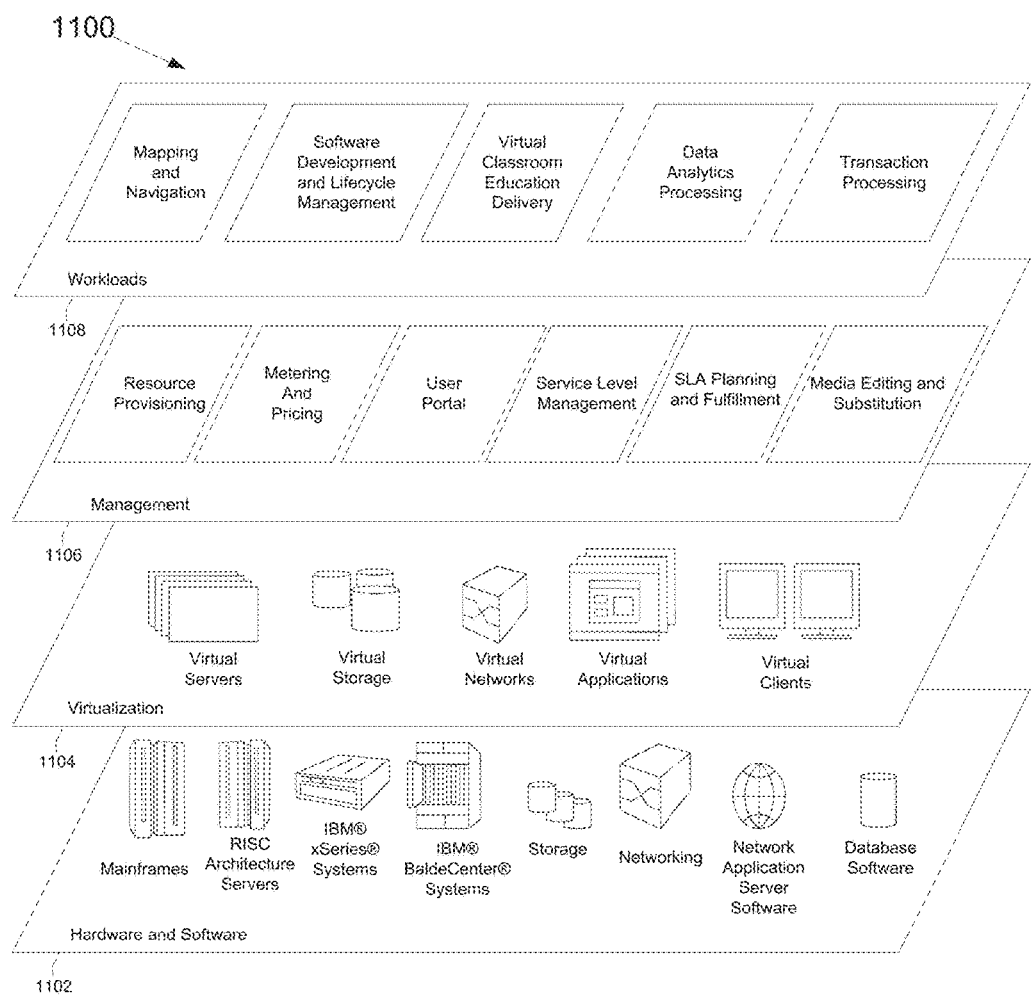
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Media editing and substitution provides a way to remove excess data from media not related to the content of interest and transparently substitute edited media for the original media when a user transmits the media.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for editing at least one media file on a device, the method comprising:
receiving a plurality of related media files, wherein the plurality of related media files depict similar images, and wherein the plurality of related media files includes a first media file and a plurality of remainder media files;
determining a new content of interest region within the first media file, wherein determining the new content of interest region within the first media file comprises identifying a region for a first time within the first media file based on tracking at least one eye of a user viewing the first media file;
generating an edited media file based on the determined new content of interest region and the first media file, wherein generating the edited media file based on the determined new content of interest region comprises removing excess data not related to the determined new content of interest region from the first media file;
generating a plurality of edited related media files based on the plurality of remainder media files and the determined new content of interest region, wherein generating the plurality of edited related media files based on the determined new content of interest region comprises removing excess data not related to the determined new content of interest region from the plurality of remainder media files; and
transmitting the edited media file and the plurality of edited related media files to a target destination.

2. The method of claim 1, further comprising:
displaying the first media file to the user.

3. The method of claim 1, wherein transmitting the edited media file and the plurality of edited related media files to the target destination comprises detecting the edited file is selected for transmission and transmitting the edited media file to the target destination in place of the at least one media file.

4. The method of claim 1, wherein removing excess data not related to the determined new content of interest region from the first media file comprises at least one of retargeting, cropping, and resizing.

5. The method of claim 1, wherein transmitting the edited media file and the plurality of edited related media files to the target destination comprises automatically generating a video file containing the edited media file and the plurality of edited related media files and transmitting the video file to the target destination.

6. A computer system for editing at least one media file on a device, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a plurality of related media files, wherein the plurality of related media files depict similar images, and wherein the plurality of related media files includes a first media file and a plurality of remainder media files;
determining a new content of interest region within the first media file, wherein determining the new content of interest region within the first media file comprises identifying a region for a first time within the first media file based on tracking at least one eye of a user viewing the first media file;
generating an edited media file based on the determined new content of interest region and the first media file, wherein generating the edited media file based on the determined new content of interest region comprises removing excess data not related to the determined new content of interest region from the first media file;

generating a plurality of edited related media files based on the plurality of remainder media files and the determined new content of interest region, wherein generating the plurality of edited related media files based on the determined new content of interest region comprises removing excess data not related to the determined new content of interest region from the plurality of remainder media files; and transmitting the edited media file and the plurality of edited related media files to a target destination.

7. The computer system of claim 6, further comprising:
displaying the first media file to the user.

8. The computer system of claim 6, wherein transmitting the edited media file and the plurality of edited related media files to the target destination comprises detecting the edited file is selected for transmission and transmitting the edited media file to the target destination in place of the at least one media file.

9. The computer system of claim 6, wherein removing excess data not related to the determined new content of interest region from the first media file comprises at least one of retargeting, cropping, and resizing.

10. The computer system of claim 6, wherein transmitting the edited media file and the plurality of edited related media files to the target destination comprises automatically generating a video file containing the edited media file and the plurality of edited related media files and transmitting the video file to the target destination.

11. A computer program product for editing at least one media file on a device, comprising:
one or more computer-readable storage medium and program instructions stored on at least one of the one or more tangible storage medium, the program instructions executable by a processor, the program instructions comprising:

program instructions to receive a plurality of related media files, wherein the plurality of related media files depict similar images, and wherein the plurality of related media files includes a first media file and a plurality of remainder media files;

program instructions to determine a new content of interest region within the first media file, wherein determining the new content of interest region within the first media file comprises identifying a region for a first time within the first media file based on tracking at least one eye of a user viewing the first media file;

program instructions to generate an edited media file based on the determined new content of interest region and the first media file, wherein generating the edited media file based on the determined new content of interest region comprises removing excess data not related to the determined new content of interest region from the first media file;

program instructions to generate a plurality of edited related media files based on the plurality of remainder media files and the determined new content of interest region, wherein generating the plurality of edited related media files based on the determined new content of interest region comprises removing excess data not related to the determined new content of interest region from the plurality of remainder media files; and program instructions to transmit the edited media file and the plurality of edited related media files to a target destination.

12. The computer program product of claim 11, further comprising:
program instructions to display the first media file to the user.

13. The computer program product of claim 11, wherein transmitting the edited media file and the plurality of edited related media files to the target destination comprises detecting the edited file is selected for transmission and transmitting the edited media file to the target destination in place of the at least one media file.

14. The computer program product of claim 11, wherein removing excess data not related to the determined new content of interest region from the first media file comprises at least one of retargeting, cropping, and resizing.

15. The computer program product of claim 11, wherein transmitting the edited media file and the plurality of edited related media files to the target destination comprises automatically generating a video file containing the edited media file and the plurality of edited related media files and transmitting the video file to the target destination.

* * * * *